United States Patent
Ramachandran et al.

(10) Patent No.: US 11,922,305 B2
(45) Date of Patent: Mar. 5, 2024

(54) SYSTEMS AND METHODS FOR SAFE POLICY IMPROVEMENT FOR TASK ORIENTED DIALOGUES

(71) Applicant: Salesforce, Inc., San Francisco, CA (US)

(72) Inventors: Govardana Sachithanandam Ramachandran, Palo Alto, CA (US); Kazuma Hashimoto, Menlo Park, CA (US); Caiming Xiong, Menlo Park, CA (US); Richard Socher, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 635 days.

(21) Appl. No.: 17/105,262

(22) Filed: Nov. 25, 2020

(65) Prior Publication Data

US 2021/0383212 A1    Dec. 9, 2021

Related U.S. Application Data

(60) Provisional application No. 63/034,653, filed on Jun. 4, 2020.

(51) Int. Cl.
| | |
|---|---|
| *G06N 3/08* | (2023.01) |
| *G06F 40/35* | (2020.01) |
| *G06N 3/006* | (2023.01) |
| *G06N 3/04* | (2023.01) |

(52) U.S. Cl.
CPC ............... *G06N 3/08* (2013.01); *G06F 40/35* (2020.01); *G06N 3/006* (2013.01); *G06N 3/04* (2013.01)

(58) Field of Classification Search
CPC . G06N 3/02; G06N 3/08; G06N 3/092; G06F 40/35
See application file for complete search history.

(56) References Cited

U.S. PATENT DOCUMENTS

| | | | |
|---|---|---|---|
| 9,589,565 B2* | 3/2017 | Boies | G10L 17/22 |
| 2018/0052825 A1* | 2/2018 | Lipton | G06N 3/00 |
| 2019/0115027 A1* | 4/2019 | Shah | G10L 17/22 |

OTHER PUBLICATIONS

Su et al. "On-line Active Reward Learning for Policy Optimisation in Spoken Dialogue Systems", 2016, arXiv:1605.07669v2.*
Liu et al. "Iterative Policy Learning in End-to-End Trainable Task-Oriented Neural Dialog Models", 2017, 2017 IEEE Automatic Speech Recognition and Understanding Workshop.*
Takanobu et al. "Guided Dialog Policy Learning: Reward Estimation for Multi-Domain Task-Oriented Dialog", 2019, arXiv:1908.10719v1.*

(Continued)

*Primary Examiner* — Jue Louie
(74) *Attorney, Agent, or Firm* — Haynes and Boone LLP (57) ABSTRACT

Embodiments described herein provide safe policy improvement (SPI) in a batch reinforcement learning framework for a task-oriented dialogue. Specifically, a batch reinforcement learning framework for dialogue policy learning is provided, which improves the performance of the dialogue and learns to shape a reward that reasons the invention behind human response rather than just imitating the human demonstration.

20 Claims, 7 Drawing Sheets

(56) References Cited

OTHER PUBLICATIONS

Liu et al. "Dialogue Policy Optimization Based on KL-GAN-A2C Model", 2019, 16th International Computer Conference on Wavelet Active Media Technology and Information Processing.*

International Search Report and Written Opinion for PCT/US2022/014034, dated May 27, 2022, 9 pages.

Zhang et al., "Find or Classify? Dual Strategy for Slot-Value Predictions on Multi-Domain Dialog State Tracking", ARXVIV. Org, Cornell University Library, 201 Olin Library, Cornell University Ithaca, NY 14853, Oct. 8, 2019, 9 pages, XP081512326.

Budzianowski et al., "Multiwoz—a large-scale multi-domain wizard-of-oz dataset for task-oriented dialogue modelling," arXiv preprint arXiv: 1810.00278, Sep. 29, 2018, 14 pages.

Chen et al., "Semantically conditioned dialog response generation via hierarchical disentangled self-attention," arXiv preprint arXiv: 1905.12866, Jun. 9, 2019, 14 pages.

Christiano et al., "Deep reinforcement learning from human preferences," In Advances in Neural Information Processing Systems, Jul. 13, 2017, 17 pages.

Devlin et al., "Bert: Pre-training of deep bidirectional transformers for language understanding," arXiv preprint arXiv:1810.04805, Oct. 11, 2018, 14 pages.

Hosseini-Asl et al., "A simple language model for task-oriented dialogue," arXiv preprint arXiv:2005.00796, Jul. 7, 2020, 22 pages.

Jaques et al., "Way off-policy batch deep reinforcement learning of implicit human preferences in dialog," arXiv preprint arXiv: 1907.00456, Jul. 8, 2019, 16 pages.

Mehri et al., Structured fusion networks for dialog, arXiv preprint arXiv:1907.10016, Jul. 23, 2019, 12 pages.

Norouzi et al., "Reward augmented maximum likelihood for neural structured prediction," In Advances in Neural Information Processing Systems, Sep. 1, 2016, 11 pages.

Paul et al., "Feature selection as causal inference: Experiments with text classification," In Proceedings of the 21st Conference on Computational Natural Language Learning (CoNLL 2017), Aug. 3-Aug. 4, 2017, pp. 163-172.

Rastogi et al., "Towards scalable multi-domain conversational agents: The schema-guided dialogue dataset," arXiv preprint arXiv: 1909.05855, Sep. 12, 2019, 11 pages.

Schulman et al., "Trust region policy optimization," In International conference on machine Learning, Feb. 19, 2015, 16 pages.

Sutton et al., "Reinforcement learning: An introduction," MIT press, 2018, 548 pages.

Thananjeyan et al., "Safety augmented value estimation from demonstrations (saved): Safe deep model-based rl for sparse cost robotic tasks," IEEE Robotics and Automation Letters, vol. 5, No. 2, May 16, 2020, 14 pages.

Thomas et al., "Data efficient off-policy policy evaluation for reinforcement learning," In International Conference on Machine Learning, Apr. 4, 2016, 37 pages.

Wen et al., "A networkbased end-to-end trainable task-oriented dialogue system," arXiv preprint arXiv:1604.04562, Apr. 15, 2016, 11 pages.

Zhang et al., "Task-oriented dialog systems that consider multiple appropriate responses under the same context," arXiv preprint arXiv:1911.10484, Dec. 2, 2019, 8 pages.

Zhao et al., "Rethinking action spaces for reinforcement learning in end-to-end dialog agents with latent variable models," arXiv preprint arXiv:1902.08858, Apr. 15, 2019, 12 pages.

Ziebart et al., "Maximum entropy inverse reinforcement learning," Proceedings of the Twenty-Third AAAI Conference on Artificial Intelligence, 2008, pp. 1433-1438.

* cited by examiner

Receive a training dataset comprising a plurality of dialogue rollouts generated by a latent stochastic behavior policy 502

Input only belief states from the observations to the neural model in a first pass 504

Generate, by a neural model, a first predicted action distribution based on a current state of the respective dialogue according to a target policy 506

Compute a first discounted sum of future reward based on a discount parameter and a reward function of actions and states of the respective dialogue according to the latent behavior policy 508

Compute a first loss objective based on a first expectation of the first discounted sum of future reward and the first predicted action distribution during the first pass 510

Input full observations to the neural model in a second pass 512

Generate, by the neural model, a second predicted action distribution based on a current observation according to a target policy 514

Compute a second discounted sum of future reward based on the discount parameter and the reward function for a specific rollout, wherein the second discounted sum of future reward is a collapsed near-deterministic approximation of the first discounted sum of future reward 516

Compute a second loss objective based on a second expectation of the second discounted sum of future reward and the second predicted action distribution, wherein the second expectation is taken over an average of the observations across the training dataset during the second pass 520

Compute a combined loss objective by summing the first loss objective and the second loss objective 522

Update the neural model based on the combined loss objective, subject to a condition that a KL-divergence between the latent stochastic behavior policy and the target policy conditioned on the current state of the respective dialogue is less than a pre-defined hyperparameter 524

*FIG. 5B*

| Model | Belief State Type | System Action Type | System Action Form | Inform (%) | Success (%) | BLEU | Combined Score |
|---|---|---|---|---|---|---|---|
| HDSA (Chen et al., 2019) | oracle | generated | graph | 82.9 | 68.9 | 23.6 | 99.5 |
| LaRL(Zhao et al., 2019) | oracle | generated | graph | 82.8 | 79.2 | 12.8 | 99.0 |
| DAMD(Zhang et al., 2019) | oracle | generated | span | 89.2 | 77.9 | 18.6 | 102.2 |
| CASPI | oracle | generated | span | 94.1 | 84.2 | 18.8 | 107.95 |

FIG. 6

| Train data | Inform % | Success % | BLEU % |
|---|---|---|---|
| 100% | 94.1 | 84.2 | 18.8 |
| 75% | 94.2 | 81.4 | 19.2 |
| 50% | 91.2 | 76.6 | 17.7 |
| 25% | 91.5 | 68.3 | 15 |

FIG. 7

SYSTEMS AND METHODS FOR SAFE POLICY IMPROVEMENT FOR TASK ORIENTED DIALOGUES

CROSS-REFERENCES

The present disclosure is a non-provisional application of and claims priority under 35 U.S.C. 119 to U.S. provisional application No. 63/034,653, filed on Jun. 4, 2020, which is hereby expressly incorporated by reference herein in its entirety.

TECHNICAL FIELD

The present disclosure relates generally to machine learning models and neural networks, and more specifically, to safe policy improvement for task-oriented dialogues.

BACKGROUND

Neural networks have been used to generate conversational responses and thus conduct a dialogue with a human user to fulfill a task. For example, a human user can engage in a conversation with an intelligent assistant to book travel tickets, make restaurant reservations, and/or the like. To fulfill a complex task, the intelligent assistant usually needs to learn to collectively complete multiple subtasks. For example, the assistant needs to reserve a hotel and book a flight so that there leaves enough time for commute between arrival and hotel check-in. For the intelligent assistant to learn such complex tasks, the intelligent assistant learns a dialogue policy to select among subtasks or options at a given time, which is often accompanied by a state tracker that tracks the status of the subtask.

Task-oriented dialogue systems are usually learnt from offline data collected using human demonstrations (e.g., past dialogues, etc.), but collecting diverse demonstrations and annotating them can be expensive. In addition, such offline task-oriented dialogue systems often involve disparate systems, such as a belief states tracker, dialogue policy management, response generation, etc. These disparate systems may induce stochasticity and its associated challenges in addition to the need for sample efficiency in effective dialogue policy learning.

Therefore, there is a need for efficient policy learning in task-oriented dialogue systems.

BRIEF DESCRIPTION OF THE DRAWINGS

In the figures, elements having the same designations have the same or similar functions.

DETAILED DESCRIPTION

Task-oriented dialogue systems are usually learnt from offline data collected using human demonstrations (e.g., past dialogues, etc.), but collecting diverse demonstrations and annotating them can be expensive. In addition, such offline task-oriented dialogue systems often involve disparate systems, such as a belief states tracker, dialogue policy management, response generation, etc. These disparate systems may induce stochasticity and its associated challenges in addition to the need for sample efficiency in effective dialogue policy learning.

Some existing systems adopt off-policy based reinforcement learning (Batch-RL) methods in solving complex task. Batch-RL methods usually use historically annotated data instead of a simulator, which may be sample efficient because inexpensive simulator are usually readily available to sample data on-policy. These techniques, however, may not perform as efficient due to the nature of dialogue policy learning. For example, off-policy based learning may often require an estimation of behavior policy for a given state, e.g., a belief state, of the underlying Markov Decision Process (MDP). In real life, a belief state does not always capture the true state of the MDP, while the MDP latent state such as prosody, among others, may induce stochasticity in the agent response at each turn. In addition, semantic information may be lost when dialogue act is generated to a natural language text. The use of mere policy imitation for dialogue act may be insufficient to provide a fair reasoning to a particular outcome, if each constituent of composite action is focused on equally.

In view of the need for efficient policy learning in task-oriented dialogue systems, embodiments described herein provide safe policy improvement in a batch reinforcement learning framework for a task-oriented dialogue. Specifically, a dialogue policy is trained on the dialogue rollout generated by a latent behavior policy with performance guarantee, e.g., by reinforcing that the performance of a new policy is at least superior to the old behavior policy for a positive gap. A training loss objective is then defined by minimizing an expected discounted sum of future reward, subject to a condition that the KL divergence between the old behavior policy and the target policy is no greater than a pre-defined hyper-parameter. In this way, the bias in training over rollouts of another policy may be much reduced, thus resulting in "safe" policy improvement.

In addition, pairwise causal reward learning is provided to shape a reward that reasons the intention of human utterance instead of mimicking a human demonstration in a batch reinforcement setting. A combination of the safe policy improvement and the pairwise causal reward learning may achieve sample efficiency in learning complex tasks.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1:
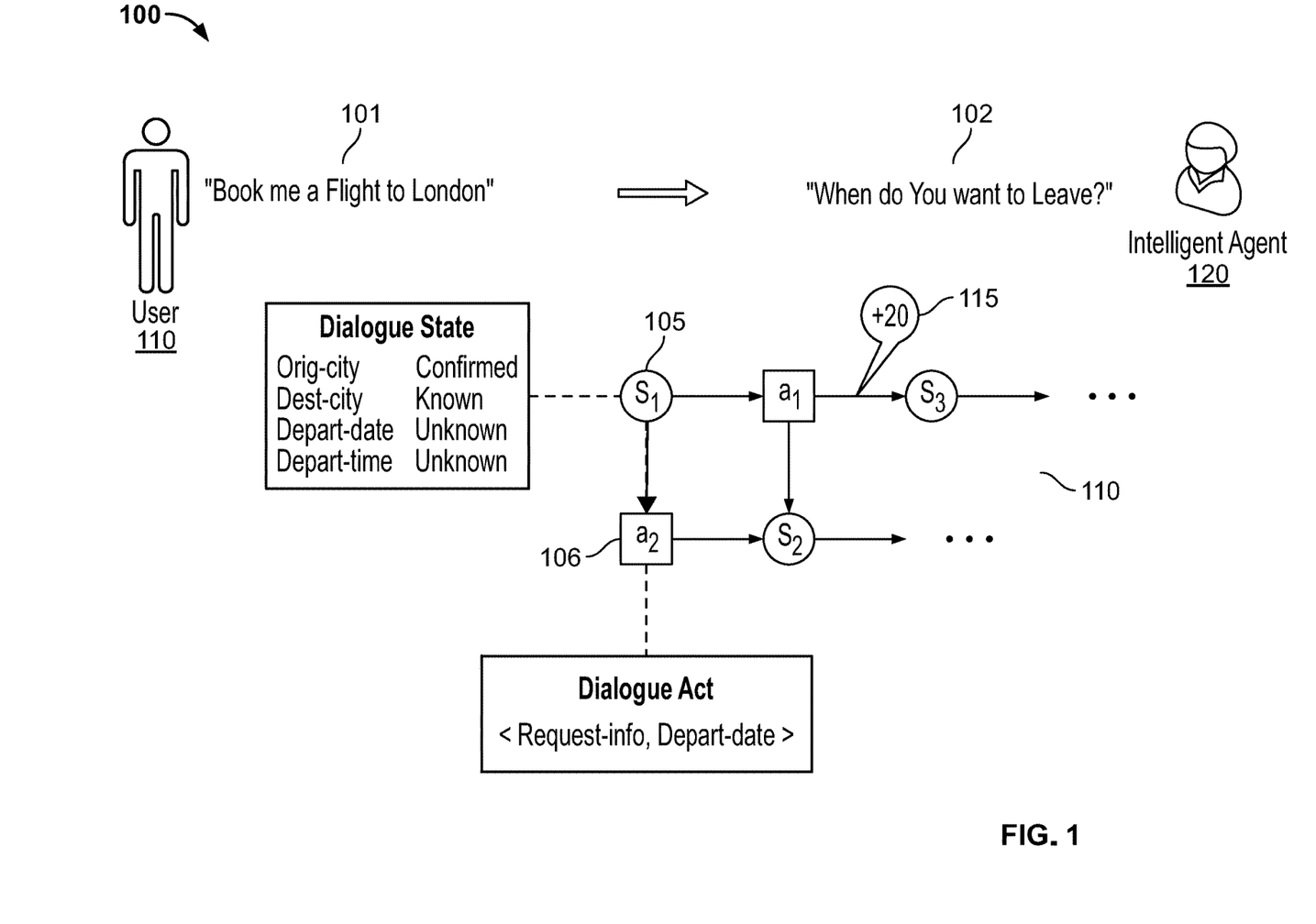
FIG. 1 provides a diagram illustrating an example task-oriented dialogue described by a Markov Decision Process upon which safe policy improvement may be applied, according to one embodiment described herein.

FIG. 1 provides a diagram 100 illustrating an example task-oriented dialogue described by a Markov Decision Process upon which safe policy improvement may be applied, according to one embodiment described herein. Diagram 100 shows a dialogue turn of a task-oriented dialogue between a user 110 and an intelligent agent 120. For example, the user 110 may provide a user utterance 101 "Book me a flight to London," and the agent 120 may respond with a system response "when do you want to leave?" 120. The dialogue between the user 110 and the intelligent agent 120 may form a task-oriented dialogue to complete the task of planning a trip to London.

The task-oriented dialogue may be modeled as a Markov Decision Process (MDP), shown by the connected graph structure 110. The MDP is described by the tuple {S, A, P, R, γ} of states S, actions A, transition probability P, reward R, and a discount factor γ. The states S are dialogue contexts that are the agent's interpretation of the environment. Actions A are possible communication behaviors that are available to the agent at each state. Transition probability P defines the probability that the states S transitions to another set of states S' given the actions A. For example, the intelligent agent 120 at time step t with state $s_t$ may perform a composite action $a_t$ as per a target policy $\pi_e(a_t|s_t)$ on the environment, with transition probabilities to the next state P(S'|S, A). For example, in the state 105 $s_1$ after user utterance 101, the original city is confirmed (per user location), the destination city "London" is obtained from the user utterance 101, but the departure date and departure time are unknown. Thus, a dialogue act 106 may be performed according to the target policy $\pi_e(a_2|s_1)$ to request information on the departure date, with the agent 120 replying to user 110 with the system response 102. After the dialogue act 106, the dialogue state transitions from state $s_1$ to $s_2$.

A latent reward function, R(a, s) with a discount factor γ∈[0, 1] is associated with the MDP 120, defining a reward value given the set of states and actions. For example, a positive reward r 115 of "20" is assigned given the state $s_1$ and dialogue act $a_1$. In one embodiment, the latent reward function R(a, s) and the discount factor γ may be pre-defined for the MDP. In another embodiment, the latent reward function R(a, s) and the discount factor γ may be learnt through the pairwise causal reward learning mechanism described in relation to FIG. 3.

Figure 2:
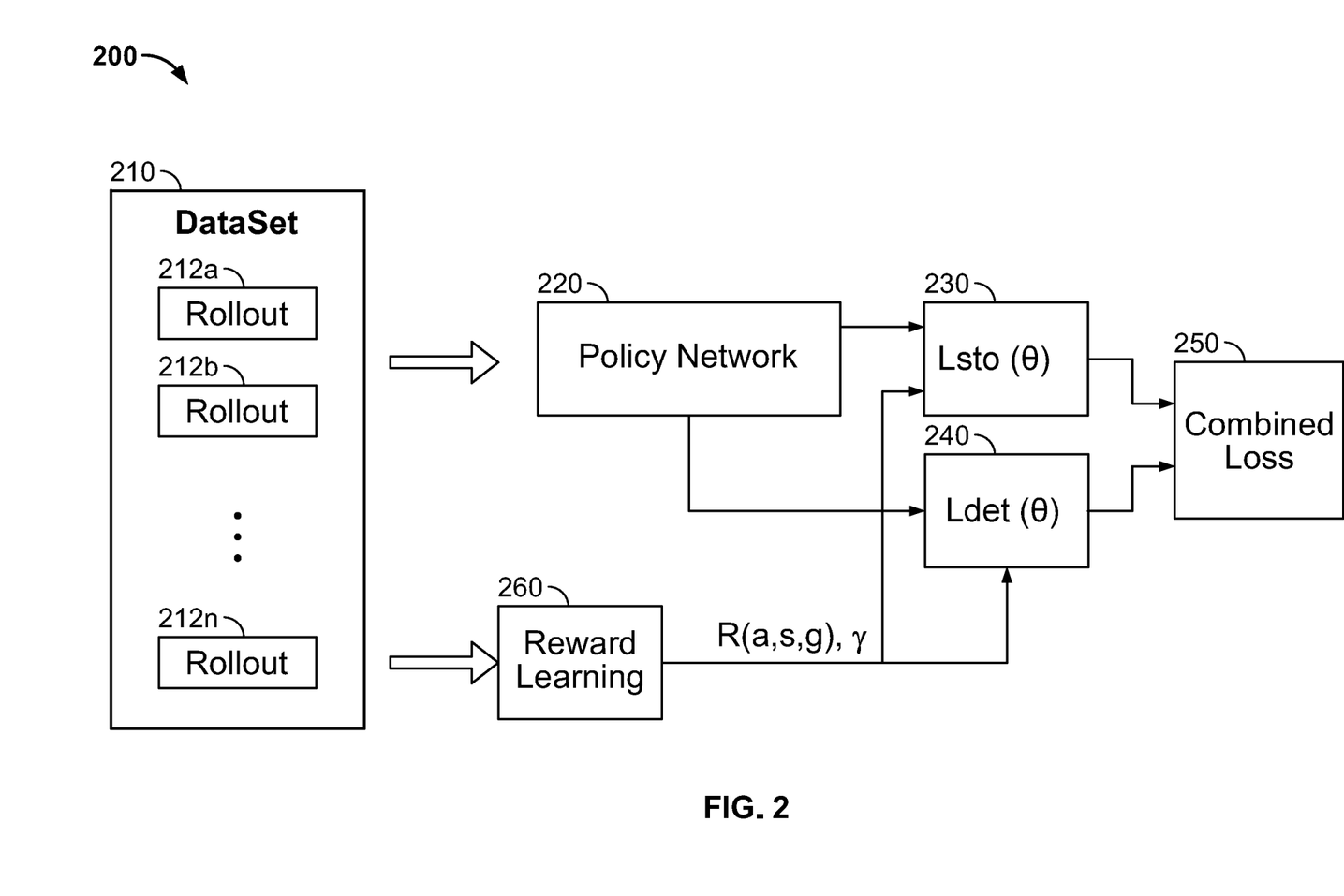
FIG. 2 provides a simplified diagram illustrating an example architecture of training a policy network with reward learning, according to one embodiment described herein.
Figure 5A:
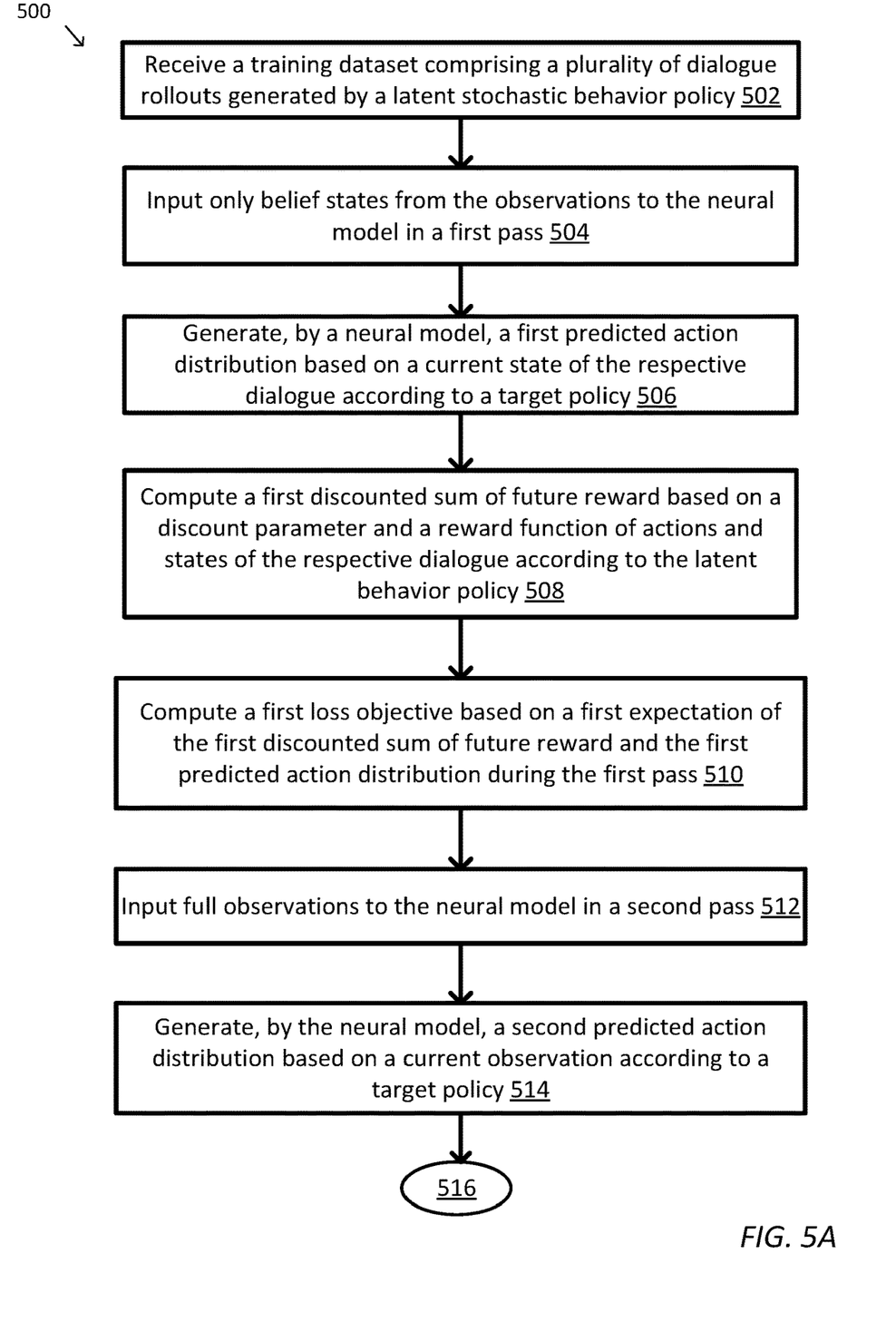
FIGS. 5A-5B provide an example logic flow diagram illustrating a method of MDP-based safe policy improvement, according to an embodiment.
Figure 5B:
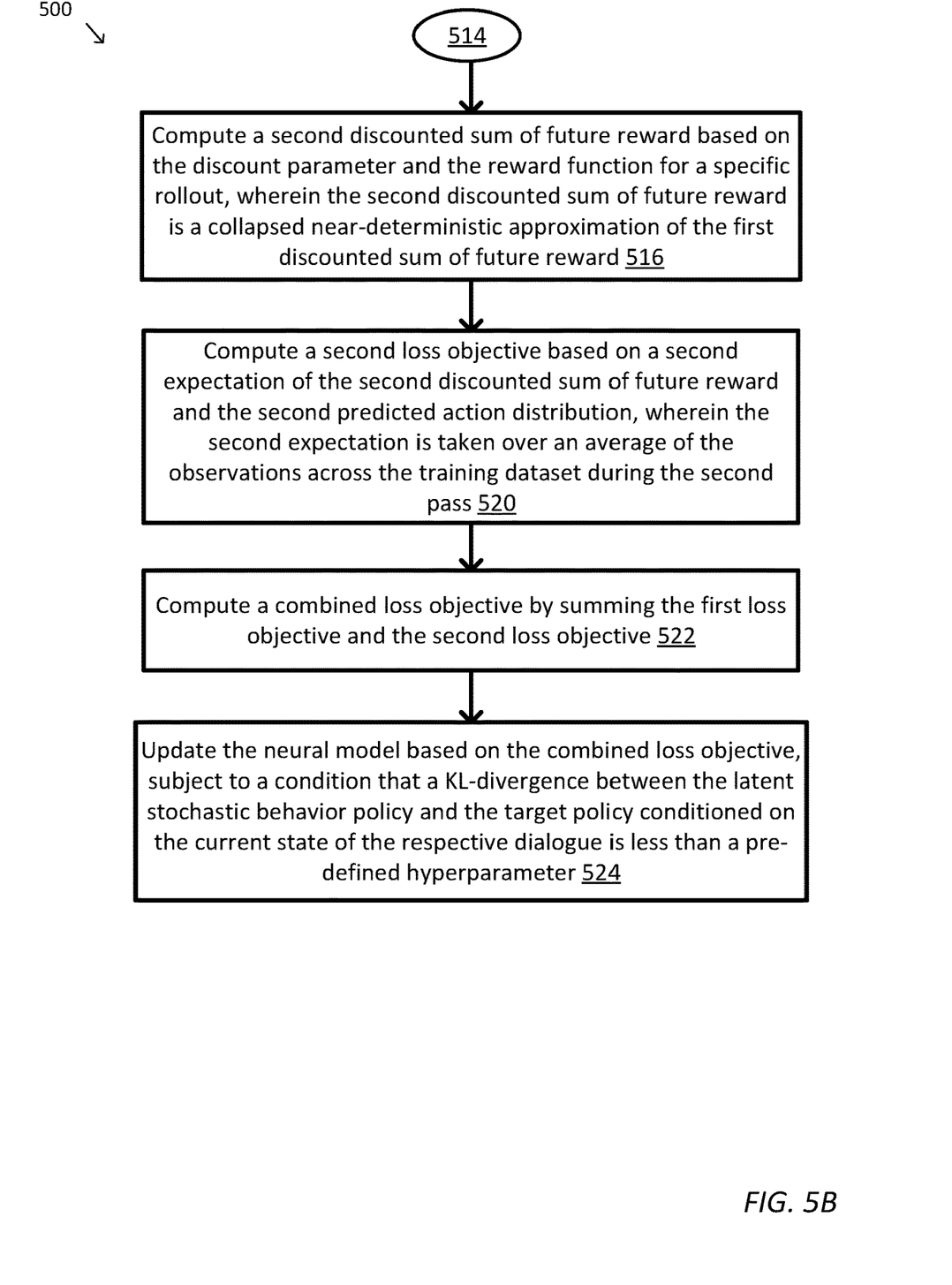

In one embodiment, given the reward function and the discount factor, the objective is to optimize for the target policy $\pi_e(a_t|s_t)$, which maximizes the expected discounted sum of future reward on the MDP, which may be written as the state-action function $Q_{\pi_e}(a_t, s_t) =$ $$\mathbb{E}_{\pi_e}\left[\sum_{t'=t}^{T} \gamma^{t'-t} r(s_{t'}, a_{t'})\right],$$

where $r(s_t', a_t')$ is the future reward at future time t', which can be similarly defined with the reward function R(a,s). To achieve this objective, a "safe" policy improvement mechanism is described in relation to FIGS. 2 and 5.

FIG. 2 provides a simplified diagram 200 illustrating an example architecture of training a policy network with reward learning, according to one embodiment described herein. Diagram 200 shows that a training dataset 210 is input to a policy network 220, and a reward learning module 260. Specifically, the dataset 220 includes a plurality of rollouts 212a-n from dialogues. The rollouts 212a-n may be generated by human agents performing actions based on a latent stochastic behavior policy.

For example, in offline Batch-RL, the intelligent agent does not get to interact with the environment. Instead, the set of offline data D 210 logged by human agents performing actions based on a latent stochastic behavior policy $\pi_b$ can be obtained. The set of offline data D 210 includes a plurality of rollouts 212a-n of a dialogue, each denoted by $\tau^i \in D$. Each rollout $\tau^i = ((o_0^i, a_0^i), \ldots, (o_{T-1}^i, a_{T-1}^i))$, where each $o_t$ is the observation at turn t, composing of $o_t = (b_t, u_t^u, u_{t-1}^a)$. Here $b_t$ is the belief state of the agent at turn t, $u_t^u$ and $u_{t-1}^a$ are the user and agent utterance at time t and t−1, respectively. Thus, batch-RL entails training a policy on rollouts generated by the latent behaviour policy.

However, directly optimizing a training objective, e.g., the discounted sum of future reward, on the rollouts of another policy, leads to a large bias in the value function estimation, poor generalization characteristic, and sample inefficiency. Thus, a "safe" policy improvement may be implemented, such that the new policy performance is bounded compared to the old policy. Specifically, the value function of the new target policy $\pi_e$ and the value function of the latent behavior policy $\pi_b$ satisfies: Pr $(V^{\pi_e} \geq V^{\pi_b} - \zeta) \geq 1 - \delta$, where $V^{\pi_e}$ and $V^{\pi_b}$ are value functions of the target policy and behavior policy, respectively. Here 1−δ and ζ are the high probability and approximation meta-parameters, respectively.

Thus, based on the input observations $o_t = (b_t, u_t^u, u_{t-1}^a)$ from the dataset 210, the policy network 220 may generate a target act distribution $\pi_e(a|s_t; \theta)$ according to a target policy $\pi_e$ and the parameter θ of the policy network. Then, a stochastic loss objective $L_{sto}(\theta)$ may be computed at loss module 230 for the safe policy improvement:

$$L_{sto}(\theta) = \min - \mathbb{E}_{s \sim p^{\pi_b}, a \sim \pi_b}\left[\frac{\pi_e(a|s_t; \theta)}{\pi_b(a|s_t; \theta)} Q^{\pi_e}(s_t, a)\right] \quad (1)$$

$$\text{s.t. } \mathbb{E}_{s \sim p^{\pi_b}}[D_{KL}(\pi_b(\cdot|s_t) \| \pi_e(\cdot|s_t))] \leq \eta$$

In some implementations, the stochastic loss objective $L_{sto}(\theta)$ may be computed using the belief state $b_t$ to replace $s_t$ in Eq. (1). The belief state is a stochastic variable as it does not capture all information. The policy $\pi_e(a|b_t; \theta)$ is computed for optimizing the stochastic loss function.

Traditionally, the update mechanism provided in Schulman et al., Trust Region Policy Optimization, in Proceedings of International conference on machine learning, pp. 1889-1897, 2015, provides bounded errors as long as the constraints of (1) are met, where $D_{KL}(.\|.)$ is the KL divergence and η is a hyper-parameter. However, the Schulman update rule requires access to the behavior policy $\pi_b(a_t|s_t)$ which is intractable to estimate. Instead, the behaviour policy conditioned on the belief state $b_t$, $\pi_b(\cdot|b_t)$ may be estimated as against $s_t$ in (1), which results in a stochastic behavior policy. The belief state $b_t$ is part of the observation $o_t$ at turn t that can be obtained from a specific rollout in the dataset D 210. Thus, in one implementation, when computing the stochastic loss objective in (1), $\pi_b(a|s_t)$ may be approximated by $\pi_b(a|b_t)$ which can be obtained from the rollouts in the dataset 210.

Based on availability of more evidence of the observation $o_t$ (which contains more information than the belief state $b_t$), the mode of the policy may collapse to a near deterministic action. To factor this into the policy learning, an additional deterministic loss may be computed at loss module 240:

$$L_{det}(\theta) = \min - \mathbb{E}_{(o_t, a_t) \sim D}[G(\tau, t) \log \pi_e(a_t|o_t)], \quad (2)$$

where $G(\tau^i,t)=\Sigma_{t'=t}^{T} \gamma_{\theta_1}^{t'-t} R_{\theta_2}(g^i, s_{t'-t}, a_{t'}^i)$ is the discounted sum of future reward for a single trajectory/episode, e.g., referred to as rollout $\tau^i$ with goal $g^i$ from time step t; the discount factor is a function of parameter $\theta_1$; $R_{\theta_2}(g, s, a)$ is reward function of the states, actions and the goal, given parameter $\theta_2$. The $R_{\theta_2}(g, s, a)$ and discount factor $\gamma_{\theta_1}$ are learnt by the reward learning module 260. Hence, the combined loss module 250 computes the policy optimization loss function as:

$$L(\theta)=L_{sto}(\theta)+L_{det}(\theta) \quad (3)$$

In one embodiment, the network 220 may be trained using just the stochastic loss $L_{sto}(\theta)$, or just the deterministic loss $L_{det}(\theta)$. Alternatively, the network 220 is trained by the sum $L(\theta)$ of the two losses as described below.

In one embodiment, the combined loss module 250 may achieve the loss function (3) via two forward passes on the policy network 220. For example, in the first pass, only the belief state $\{b_t\}$ from the dataset 210 are input to the policy network 220 such that the first pass captures the stochasticity of the policy conditioned only on the belief state $\{b_t\}$. During the first pass, the stochastic loss module 230 computes the stochastic loss in (1) using the action distribution output $\pi_e(a|s_t; \theta)$ from the policy network 220. In the second pass, all the observation information $\{o_t=(b_t, u_t^u, u_{t-1}^a)\}$ from the dataset 210 is input to the policy network 220 to get the action distribution $\pi_e(a_t|o_t)$ for the deterministic loss module 240 to compute the deterministic loss in (2). The second pass collapses the mode given other latent information of the state, such as $u^u$ and $u^a$. After the two passes, the combined loss module 250 compute the loss objective in (3), which may be used to update the policy network 220 via backpropagation. Further details of the work flow for implementing the safe policy improvement with policy network 220 can be found in relation to FIGS. 5A-5B.

As shown above, the stochastic loss objective (1) for safe policy improvement requires the Q-function of the latent behaviour policy, which can be estimated using Monte Carlo sampling on the dataset D, given the reward R(s, a, g) is known. The reward learning module 260 provides a mechanism to learn a reward that is causally reasoned on the intention of the human demonstrator. The reward learning module 260 provides the reward function R(s, a, g) and the discount parameter $\gamma$ to the stochastic loss module 230 and the deterministic loss module 240. Further details of the reward learning module 260 is described below in relation to FIG. 3.

Figure 3:
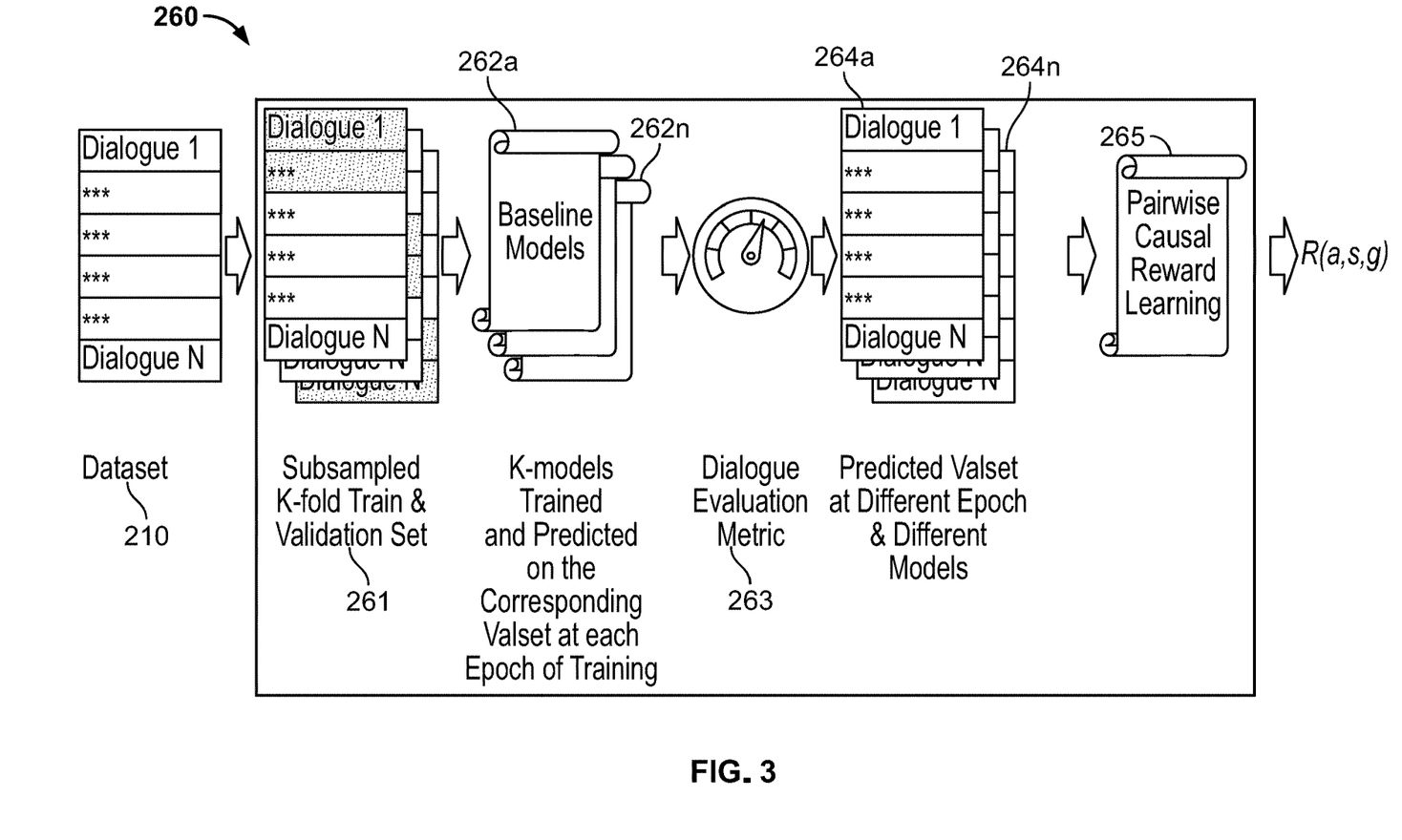
FIG. 3 provides a simplified diagram illustrating aspects of the workflow inside the reward learning module shown in FIG. 2, according to one embodiment.

FIG. 3 provides a simplified diagram illustrating aspects of the workflow inside the reward learning module 260 shown in FIG. 2, according to one embodiment. Specifically, dialogue policy learning is usually accompanied by a metric M, to evaluate the performance of the learnt policy. Though these metrics could serve as a proxy for a reward function, directly combining them into learning the reward can be challenging. For example, these metric functions usually return a metric score for the entire dialogue. Given the complex state-action space of the dialogue management system, the scores at the dialogue level are under-specified for rewarding an action performed at each dialogue turn.

To address this under-specified feedback, a preference learning may be adapted from an online setting to an offline setting. For example, the preference learning was originally proposed in Paul et al., Feature selection as causal inference: Experiments with text classification, in Proceedings of the 21st Conference on Computational Natural Language Learning, pages 163-172, 2017. The reward can be parametrized for every timestep t, as $r(o_t, a_t, g)$. Given a pair of rollouts $\tau^1, \tau^2 \in D$ with actions for each state in the rollouts sampled from the learnt policies $\pi_e^1$ and $\pi_e^2$, respectively, let $P[\tau^1 \succ \tau^2]$ be the probabilistic measure that captures the preference of $\pi_e^1$ over $\pi_e^2$, then this preference is true when the returns $G(\tau^1) > G(\tau^2)$. Then this probability distribution can be computed based on two discounted sums of future reward corresponding to a first dialogue rollout $\tau^1$ and a second dialogue rollout $\tau^2$ corresponding to the pair of predicted dialogues, respectively:

$$P[\tau^1 \succ \tau^2] = \frac{\exp(G(\tau^1))}{\exp(G(\tau^1))+\exp(G(\tau^2))}.$$

In another implementation, the probability may be computed using hyper parameters:

$$P[\tau^1 \succ \tau^2] = \frac{\exp(\sum_{t=1}^{T} r(o_t^1, a_t^1, g^1))}{\exp(\sum_{t=1}^{T} r(o_t^1, a_t^1, g^1))+\exp(\sum_{t=1}^{T} r(o_t^2, a_t^2, g^2))}$$

Thus, reward r may be optimized by minimizing a binary cross-entropy loss between the preference probability $P[\tau^1 \succ \tau^2]$ and the normalized metrics score $\mu(\tau)$ between a pair of rollouts. For example, the normalized metric score is computed based on a first metric score of a first dialogue $\tau^1$ from the pair and a second metric score of a second dialogue $\tau^2$ from the pair, and both the first metric score and the second metric score are generated by the same score function M ( ), e.g., $$\mu(\tau^1) = \frac{M(\tau^1)}{M(\tau^1)+M(\tau^2)}.$$

In this way, the network (with the reward) is trained to generate dialogues with performance metrics that can closely reflect the preference between a rollout pair. The loss objective for pairwise reward learning can be computed by:

$$L(\theta_1,\theta_2)=\min- \mathbb{E}_{\tau^1,\tau^2\sim\Pi}[\mu(\tau^1)\log P[\tau^1 \succ \tau^2]+\mu(\tau^2)\log P[\tau^2 \succ \tau^1]] \quad (4)$$

Here $\theta_1$ and $\theta_2$ correspond to the parameters for reward R(a, s, g; $\theta_1$) and discount factor $\gamma(\theta_2)$, respectively. Specifically, the discount factor $\gamma$ may be pre-defined, or learnt during training.

The reward learning module 260 receives and splits the dataset D into K-fold training and validation subsets 261. For example, the dataset 210 is partitioned into complementary subsets 261, performing training on one subset, and validating the trained network on another (test) subset. At every epoch of training, K-baseline models 261a-n are trained based on cross entropy loss (instead of (3)) using the K training subsets. The trained K-baseline models 261a-n are used to predict on the corresponding validation subsets, and each baseline model may be similar to the neural model used by the policy network 220. The predicted action distribution from the K-baseline models are used to generate output dialogues 264a-n, each of which is scored by a chosen metric 263. Thus, a pair of dialogues from the predicted dialogues 264a-n with corresponding score functions may be used to compute the pairwise reward loss (4) at the pairwise causal reward learning module 265. The pairwise reward loss (4) may then be used to backpropagate a neural network to update the parameters $\theta_1, \theta_2$. In this way, the pairwise causal reward learning module 265 outputs the reward function reward R(a, s, g; $\theta_1$) and discount factor $\gamma(\theta_2)$. For example, the neural network for the pairwise causal reward learning module 265 may be a one bi-LSTM layer that embeds action, state and goal, followed by a couple of multilayer perceptron (MLP) layers.

Figure 4:
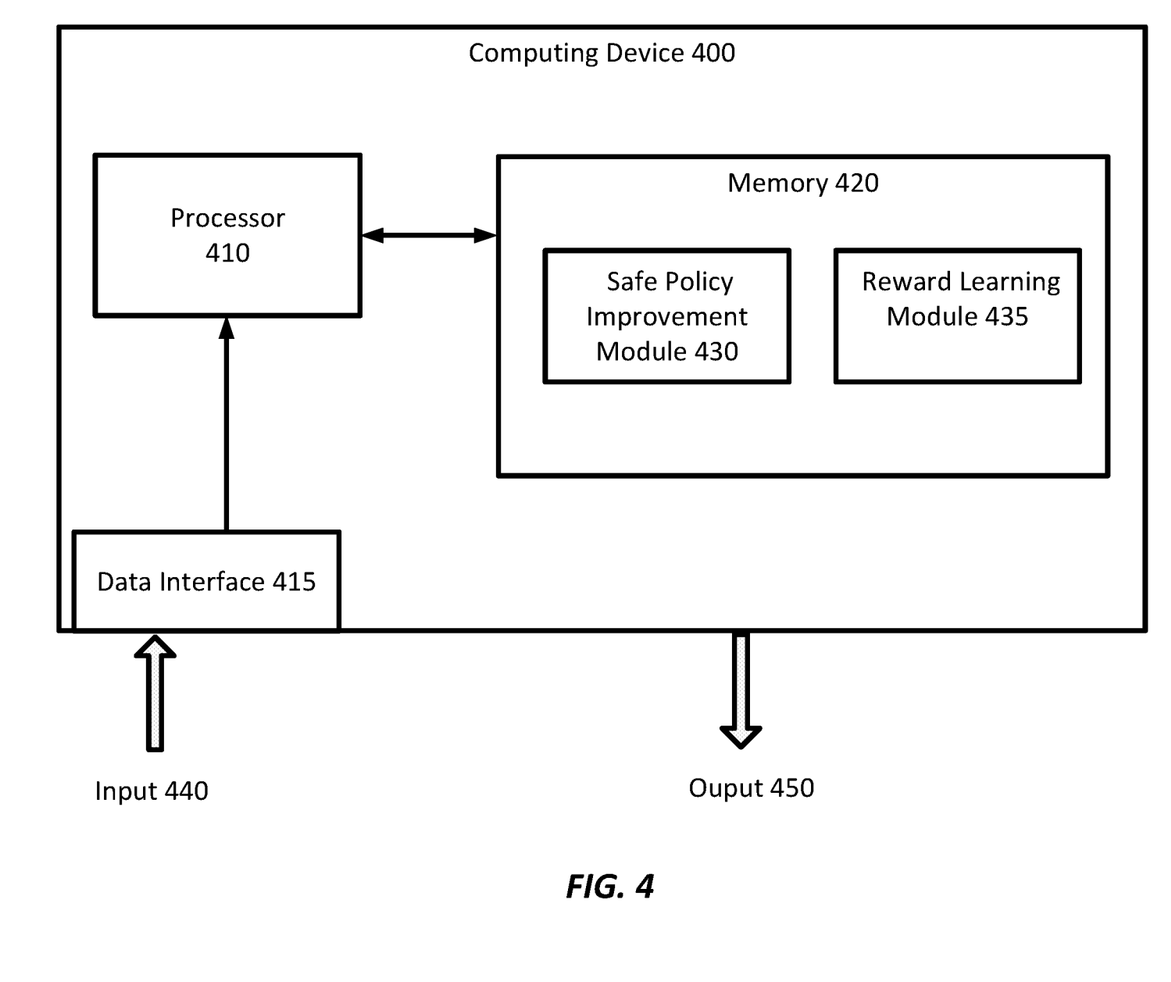
FIG. 4 is a simplified diagram of a computing device for implementing the safe policy improvement and reward learning for task-oriented dialogue, according to some embodiments.

FIG. 4 is a simplified diagram of a computing device for implementing the safe policy improvement and reward learning for task-oriented dialogue, according to some embodiments. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for a safe policy improvement module 430 and a reward learning module 435 that may be used to implement and/or emulate the systems and models, and/or to implement any of the methods described further herein. In some examples, the safe policy improvement module 430 and the reward learning module 435 receives an input 440 via a data interface 415 and may generate an output 450.

For example, the input 440 may include a training dataset 210 as shown in FIGS. 2-3. The data interface 215 may include a communication interface that receives the dataset input 440 from a remote database via a communication network. In another example, the data interface 215 may include a user interface via which a user may select and load the dataset input 440 to the processor 410. The output 450 may include an action distribution for a dialogue, an optimized policy, and/or the like.

The safe policy improvement module 430 may comprise a policy network 220, a stochastic loss module 230, a deterministic loss module 240, and a combined loss module 250 shown in FIG. 2. The reward learning module 435 may be similar to module 260 shown in FIG. 2, which is further detailed in FIG. 3. The reward learning module 435, as described in relation to FIG. 3, may comprise K-base models 262a-n and a pairwise causal reward learning module 265.

FIGS. 5A-5B provide an example logic flow diagram illustrating a method 500 of MDP-based safe policy improvement, accordingly to an embodiment. One or more of the processes 502-524 of method 500 may be implemented, at least in part, in the form of executable code stored on non-transitory, tangible, machine-readable media that when run by one or more processors may cause the one or more processors to perform one or more of the processes 502-524. In some embodiments, method 500 may correspond to the method used by the module 430.

At process 502, A training dataset (e.g., dataset 210) comprising a plurality of dialogue rollouts (e.g., rollouts 212a-n) generated by a latent stochastic behavior policy is received. Each rollout includes a time series of observations representing information of a respective dialogue at a plurality of dialogue turns.

At process 504, only belief states (e.g., $\{b_t\}$) from the observations of the training dataset is input to a neural model (e.g., policy network 220) in a first pass to the neural model.

At process 506, a first predicted action distribution is generated based on a current state of the respective dialogue according to a target policy, e.g., $\pi_e$ ($a|s_t; \theta$).

At process 508, a first discounted sum of future reward based on a discount parameter and a reward function of actions and states of the respective dialogue according to the latent behavior policy. Specifically, during the first pass, an action distribution is conditioned on a belief state according to the latent stochastic behavior policy, and the belief state is obtained from the time series of observations.

At process 510, a first loss objective is computed based on a first expectation of the first discounted sum of future reward and the first predicted action distribution. Specifically, the first expectation is taken over a probability distribution of the states and the actions according to the latent stochastic behavior policy, e.g., according to (1).

At process 512, the full observations are input to the neural model in a second pass. For example, in addition to the belief states, all the observation information $\{o_t=(b_e, u_t^u, u_{t-1}^a)\}$ from the dataset 210 is input to the policy network 220.

At process 514, a second predicted action distribution is generated based on a current observation from the time series of observations according to the target policy. For example, the action distribution $\pi_e(a_t|o_t)$ is generated.

At process 516, a second discounted sum of future reward based on the discount parameter and the reward function for a specific rollout is computed, e.g., $G(\tau^i, t)=$ $$\sum_{t'=t}^{T} \gamma_{\theta_1}^{t'-t} R_{\theta_2}(g^i, s_{t'-t}, a_{t'}).$$

Specifically, the second discounted sum of future reward is a collapsed near-deterministic approximation of the first discounted sum of future reward.

At process 520, a second loss objective is computed based on a second expectation of the second discounted sum of future reward and the second predicted action distribution. Specifically, the second expectation is taken over an average of the observations across the training dataset. For example, the second loss objective is computed by the deterministic loss module 240 according to (2).

At process 522, a combined loss objective is compute by summing the first loss objective and the second loss objective, e.g., according to (3).

At process 524, the neural model is updated based on the combined loss objective, subject to a condition that a KL-divergence between the latent stochastic behavior policy and the target policy conditioned on the current state of the respective dialogue is less than a pre-defined hyperparameter.

It is noted that embodiments described throughout FIGS. 1-5 relate to dialogue policy learning. However, similar embodiments can be applied to different tasks in similar settings, such as but no limited to end-to-end dialogue system training (e.g., dialogue state tracker, dialogue policy and response generation, etc.), and/or the like.

Example Performance

In one embodiment, the training dataset (e.g., 210) can be the MultiWoz2.0 dataset, a multi-turn multi-domain dataset spanning seven domains, including attraction, hospital, hotel, police, taxi, train and an additional domain for general greeting. The dataset is created from real human conversation, between a tourist and a clerk at an information center. Each dialogue covers one to three domains with maximum of 13 turns in a conversation.

In one embodiment, the policy network 220 may adopt a neural model proposed in Zhang et al., Task-oriented dialog systems that consider multiple appropriate responses under the same context, arXiv preprint arXiv:1911.10484, 2019 as the baseline. For the pairwise casual reward learning network 260, a one bi-LSTM layer to embed action, state and goal, followed by couple of MLP layers may be used.

In one embodiment, database results are represented as one-hot vectors. To reduce surface-level variability in the responses, domain-adaptive delexicalization preprocessing is adopted, and delexicalized responses are generated with placeholders for specific values which can be filled according to the current utterance that refers to some slot values offered by the system in the previous turn.

In one embodiment, context-to-response generation task of Multi-woz2.0 may be implemented and the corresponding evaluation metrics are used to measure the quality of the response. These include inform rate and success rate which measures the fraction of dialogue, the system has provided requested information and the fraction of the dialogues the system has answered all the requested information respectively, and BLEU is used to measure the fluency of the generated response. A combined score (Inform+Success)×0.5+BLEU is used as the metric score function. For pairwise causal reward learning, a soft version of the same metrics that measure the fraction of correctness is used rather than being boolean.

Figure 6:
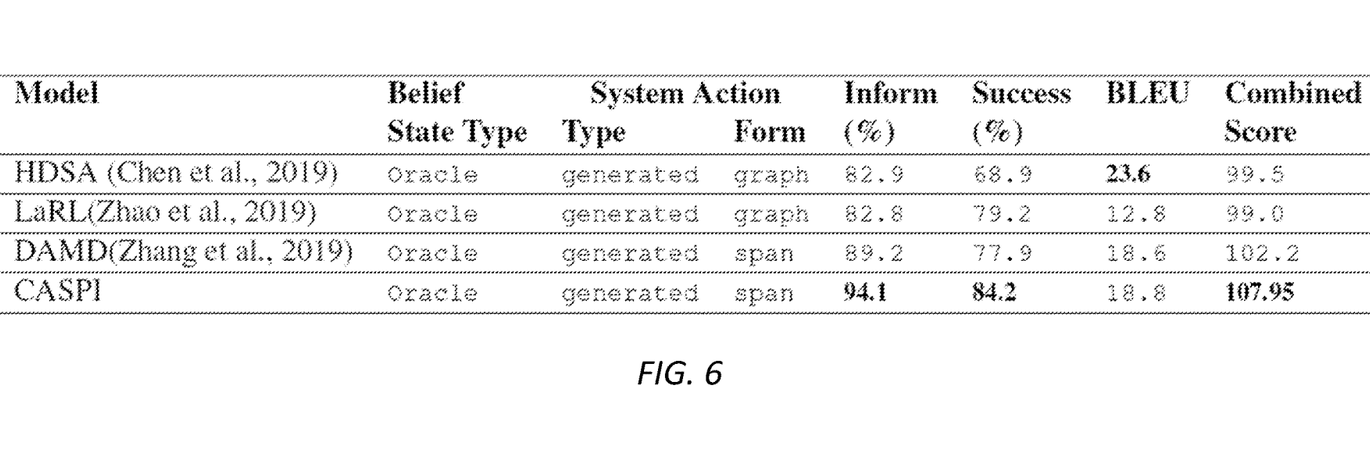
FIGS. 6-7 provide data charts showing example performance comparison of the safe policy improvement with existing methods, according to one embodiment.

The causal aware safe policy improvement (CASPI) is compared against existing methods on context-to-response generation task of Multiwoz2.0 in FIG. 6. The existing methods include domain-aware multi-decoder in Zhang et al.—which uses data augmentation by exploiting the stochasticity of the dialogue state-action space, Hierarchical disentangled self-attention network, a BERT (Devlin et al., BERT: Pre-training of deep bidirectional transformers for language understanding, arXiv preprint arXiv:1810.04805, 2018) based action predict system and structure fusion networks for automatic evaluation of machine translation, and (Chen et al., Semantically conditioned dialog response generation via hierarchical disentangled self-attention. arXiv preprint arXiv:1905.12866, 2019), a seq2seq network with supervised learning bootstrapping followed by reinforcement fine tuning. A median of 5 amortized runs of CASPI is reported. CASPI outperforms all methods on success and inform rate by a large margin. Though BLEU of HDSA is better than that of CASPI, this is attributed to the use of a large BERT based model, the network improvement was not focus of this work; further improvement to BLEU can be made by replacing CASPI's simple GRU and attention network.

Figure 7:
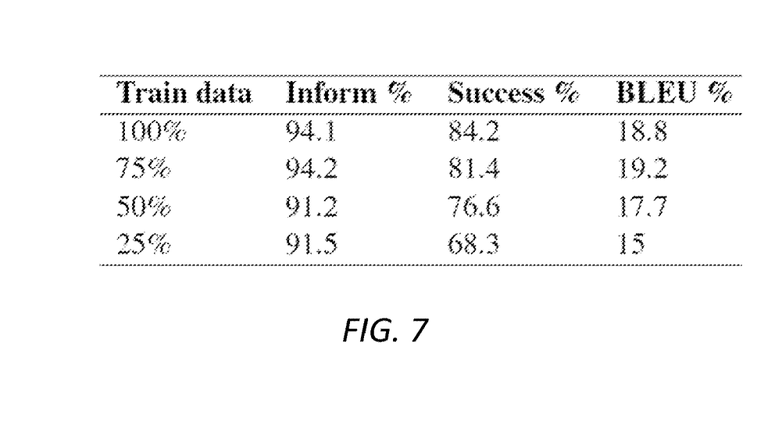

The sample efficiency of CASPI by using 25, 50, 75 and 100% of MultiWoz train data is shown in FIG. 7. CASPI achieves performance comparable to existing methods on success and inform rate with just 50% of the data. This is achieved by giving more reward to utterance with important semantic information rather than other syntactic, prosodic and other latent information.

Some examples of computing devices, such as computing device 100 may include non-transitory, tangible, machine readable media that include executable code that when run by one or more processors (e.g., processor 110) may cause the one or more processors to perform the processes of method 200. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for policy improvement in task-oriented learning, the method comprising:
   receiving a training dataset comprising a plurality of dialogue rollouts generated by a latent stochastic behavior policy, wherein each rollout includes a time series of observations representing information of a respective dialogue at a plurality of dialogue turns;
   generating, by a neural model, a first predicted action distribution based on a current state of the respective dialogue according to a target policy;
   computing a first discounted sum of future reward based on a discount parameter and a reward function of actions and states of the respective dialogue according to the latent behavior policy;
   computing a first loss objective based on a first expectation of the first discounted sum of future reward and the first predicted action distribution, wherein the first expectation is taken over a probability distribution of the states and the actions according to the latent stochastic behavior policy; and
   updating the neural model by minimizing at least the first loss objective subject to a condition that a KL-divergence between the latent stochastic behavior policy and the target policy conditioned on the current state of the respective dialogue is less than a pre-defined hyperparameter.

2. The method of claim 1, wherein the first loss objective is further computed by estimating an action distribution conditioned on a belief state according to the latent stochastic behavior policy, and wherein the belief state is obtained from the time series of observations.

3. The method of claim 1, further comprising:
   generating, by the neural model, a second predicted action distribution based on a current observation from the time series of observations according to the target policy;
   computing a second discounted sum of future reward based on the discount parameter and the reward function for a specific rollout, wherein the second discounted sum of future reward is a collapsed near-deterministic approximation of the first discounted sum of future reward;
   computing a second loss objective based on a second expectation of the second discounted sum of future reward and the second predicted action distribution, wherein the second expectation is taken over an average of the observations across the training dataset.

4. The method of claim 3, further comprising:
   at each training epoch:
      inputting only belief states from the time series of observations to the neural model in a first pass;
      computing the first loss objective using the first predicted action distribution that is generated from the inputted belief states during the first pass;
      inputting the time series of observations to the neural model in a second pass; and
      computing the second loss objective using the second predicted action distribution that is generated from the inputted observations during the second pass.

5. The method of claim 3, further comprising:
   computing a combined loss objective by summing the first loss objective and the second loss objective; and
   updating the neural model based on the combined loss objective.

6. The method of claim 1, further comprising:
   obtaining the reward function and the discount factor from pairwise causal reward learning that is operated concurrently with updating the neural model.

7. The method of claim 6, wherein the pairwise causal reward learning comprises:
   dividing the plurality of dialogue rollouts into a number of training subsets and a number of validation subsets;
   training a number of baseline models based on a cross-entropy loss using the number of training subsets, respectively;
   generating, via each of the baseline models, a respective predicted dialogue using a respective validation subset;
   scoring the respective predicted dialogue using a score function;
   identifying a pair of predicted dialogues scored by a same score function; and
   computing a third loss objective based on a binary cross-entropy loss between a preference probability of one of the predicted dialogues and a normalized metric score.

8. The method of claim 7, wherein the preference probability of one of the predicted dialogues is computed based on two discounted sums of future reward corresponding to a first dialogue rollout and a second dialogue rollout corresponding to the pair of predicted dialogues, respectively.

9. The method of claim 7, wherein the normalized metric score is computed based on a first metric score of a first dialogue from the pair and a second metric score of a second dialogue from the pair, and wherein both the first metric score and the second metric score are generated by the same score function.

10. The method of claim 7, further comprising:
    updating a neural network for reward learning based on the third loss objective; and
    obtain the reward function and the discounted factor based on updated parameters of the neural network.

11. A system for policy improvement in task-oriented learning, the system comprising:
    a data interface configured to receive a training dataset comprising a plurality of dialogue rollouts generated by a latent stochastic behavior policy, wherein each rollout includes a time series of observations representing information of a respective dialogue at a plurality of dialogue turns;
    a memory configured to store a neural model;
    a processor configured to:
    generate, by the neural model, a first predicted action distribution based on a current state of the respective dialogue according to a target policy;
    compute a first discounted sum of future reward based on a discount parameter and a reward function of actions and states of the respective dialogue according to the latent behavior policy;
    compute a first loss objective based on a first expectation of the first discounted sum of future reward and the first predicted action distribution, wherein the first expectation is taken over a probability distribution of the states and the actions according to the latent stochastic behavior policy; and update the neural model by minimizing at least the first loss objective subject to a condition that a KL-divergence between the latent stochastic behavior policy and the target policy conditioned on the current state of the respective dialogue is less than a pre-defined hyperparameter.

12. The system of claim 11, wherein the first loss objective is further computed by estimating an action distribution conditioned on a belief state according to the latent stochastic behavior policy, and wherein the belief state is obtained from the time series of observations.

13. The system of claim 11, wherein the processor is further configured to:

generate, by the neural model, a second predicted action distribution based on a current observation from the time series of observations according to the target policy;

compute a second discounted sum of future reward based on the discount parameter and the reward function for a specific rollout, wherein the second discounted sum of future reward is a collapsed near-deterministic approximation of the first discounted sum of future reward;

compute a second loss objective based on a second expectation of the second discounted sum of future reward and the second predicted action distribution, wherein the second expectation is taken over an average of the observations across the training dataset.

14. The system of claim 13, wherein the processor is further configured to:

at each training epoch:

input only belief states from the time series of observations to the neural model in a first pass;

compute the first loss objective using the first predicted action distribution that is generated from the inputted belief states during the first pass;

input the time series of observations to the neural model in a second pass; and compute the second loss objective using the second predicted action distribution that is generated from the inputted observations during the second pass.

15. The system of claim 13, wherein the processor is further configured to:

compute a combined loss objective by summing the first loss objective and the second loss objective; and update the neural model based on the combined loss objective.

16. The system of claim 11, wherein the processor is further configured to:

obtain the reward function and the discount factor from pairwise causal reward learning that is operated concurrently with updating the neural model.

17. The system of claim 16, wherein the pairwise causal reward learning comprises:

dividing the plurality of dialogue rollouts into a number of training subsets and a number of validation subsets;

training a number of baseline models based on a cross-entropy loss using the number of training subsets, respectively;

generating, via each of the baseline models, a respective predicted dialogue using a respective validation subset;

scoring the respective predicted dialogue using a score function;

identifying a pair of predicted dialogues scored by a same score function; and computing a third loss objective based on a binary cross-entropy loss between a preference probability of one of the predicted dialogues and a normalized metric score.

18. The system of claim 17, wherein the preference probability of one of the predicted dialogues is computed based on two discounted sums of future reward corresponding to a first dialogue rollout and a second dialogue rollout corresponding to the pair of predicted dialogues, respectively.

19. The system of claim 17, wherein the normalized metric score is computed based on a first metric score of a first dialogue from the pair and a second metric score of a second dialogue from the pair, and wherein both the first metric score and the second metric score are generated by the same score function.

20. A processor-readable non-transitory medium storing processor-executable instructions for policy improvement in task-oriented learning, the instructions being executed by a processor to perform operations comprising:

receiving a training dataset comprising a plurality of dialogue rollouts generated by a latent stochastic behavior policy, wherein each rollout includes a time series of observations representing information of a respective dialogue at a plurality of dialogue turns;

generating, by a neural model, a first predicted action distribution based on a current state of the respective dialogue according to a target policy;

computing a first discounted sum of future reward based on a discount parameter and a reward function of actions and states of the respective dialogue according to the latent behavior policy;

computing a first loss objective based on a first expectation of the first discounted sum of future reward and the first predicted action distribution, wherein the first expectation is taken over a probability distribution of the states and the actions according to the latent stochastic behavior policy; and updating the neural model by minimizing at least the first loss objective subject to a condition that a KL-divergence between the latent stochastic behavior policy and the target policy conditioned on the current state of the respective dialogue is less than a pre-defined hyperparameter.

* * * * *